US009427816B2

(12) United States Patent
Milletari et al.

(10) Patent No.: US 9,427,816 B2
(45) Date of Patent: Aug. 30, 2016

(54) METHOD AND AUTOMATIC MACHINE FOR MACHINING A GEAR WHEEL

(71) Applicant: GE AVIO S.r.l., Rivalta di Torino (IT)

(72) Inventors: Salvatore Milletari, Turin (IT); Rinaldo Siccardi, Orbassano (IT)

(73) Assignee: GE AVIO S.R.L., Rivalta di Torino (IT)

( * ) Notice: Subject to any disclaimer, the term of this patent is extended or adjusted under 35 U.S.C. 154(b) by 295 days.

(21) Appl. No.: 14/276,597

(22) Filed: May 13, 2014

(65) Prior Publication Data
US 2015/0071722 A1  Mar. 12, 2015

(30) Foreign Application Priority Data

May 14, 2013  (IT) ............................... TO2013A0385

(51) Int. Cl.
| | | |
|---|---|---|
| *B23Q 15/20* | (2006.01) | |
| *B23F 23/12* | (2006.01) | |
| *B23B 31/02* | (2006.01) | |
| *B23F 23/06* | (2006.01) | |
| *B23B 41/00* | (2006.01) | |
| *B23B 25/06* | (2006.01) | |
| *B23F 17/00* | (2006.01) | |
| *B23F 19/00* | (2006.01) | |
| *B23F 23/04* | (2006.01) | |

(Continued)

(52) U.S. Cl.
CPC ........... *B23F 23/1218* (2013.01); *B23B 25/06* (2013.01); *B23B 31/025* (2013.01); *B23B 41/00* (2013.01); *B23F 17/006* (2013.01); *B23F 19/00* (2013.01); *B23F 23/04* (2013.01); *B23F 23/06* (2013.01); *B23Q 2716/00* (2013.01); *Y10T 408/05* (2015.01); *Y10T 408/175* (2015.01); *Y10T 409/107632* (2015.01)

(58) Field of Classification Search
CPC .... B23B 31/025; B23Q 15/20; B23Q 15/22; B23Q 15/24; B23Q 15/26; B23Q 16/00; B23Q 2017/001; B23Q 17/003; B23Q 17/22; B23Q 2716/00; B23Q 2716/02; B23Q 2716/04; B23Q 2716/06; B23Q 2716/08; Y10T 408/175; Y10T 408/05; Y10T 409/303864; Y10T 409/102226; Y10T 409/10954; Y10T 409/109699
USPC ...................................... 451/51, 47, 5, 8–10
See application file for complete search history.

(56) References Cited

U.S. PATENT DOCUMENTS 5,022,195 A * 6/1991 Cattelain ................ B23Q 3/183
451/381

(Continued)

FOREIGN PATENT DOCUMENTS

DE  10 2008 010369 B3  11/2009
DE  10 2011 013457 A1  9/2012

OTHER PUBLICATIONS

Italian Search Report dated Jan. 29, 2014 in application No. ITTO20130385.

*Primary Examiner* — Daniel Howell
*Assistant Examiner* — Nicole N Ramos
(74) *Attorney, Agent, or Firm* — Maschoff Brennan

(57) ABSTRACT

The axis of rotation of a gear wheel subjected to thermal treatment and comprising at least one intermediate crown wheel and a pair of lateral tubular hubs arranged on opposite sides of the crown wheel is restored automatically by coupling a first of the hubs to a head rotating about a fixed axis of own rotation axis, displacing the other hub in a direction transverse to the fixed axis until both of the hubs and the crown wheel are brought into positions substantially sharing the fixed axis and providing on each of the hubs a respective centring surface sharing the fixed axis without uncoupling the first hub from the rotating head and keeping the gear wheel in a vertical and angularly fixed position.

16 Claims, 8 Drawing Sheets

(56) References Cited

U.S. PATENT DOCUMENTS

| | | | |
|---|---|---|---|
| 5,035,554 A * | 7/1991 | Nickols | B23Q 17/2216 33/626 |
| 5,109,634 A | 5/1992 | Cattelain et al. | |
| 5,189,846 A * | 3/1993 | Griswold | B23Q 15/26 451/249 |
| 7,188,420 B2 * | 3/2007 | Fisher | B23B 31/025 279/136 |
| 8,069,698 B2 * | 12/2011 | Murata | B21J 5/02 72/345 |
| 2007/0199187 A1 | 8/2007 | Ohmori et al. | |
| 2010/0138006 A1 * | 6/2010 | Mies | B23Q 15/26 700/57 |

* cited by examiner

METHOD AND AUTOMATIC MACHINE FOR MACHINING A GEAR WHEEL

The present invention relates to a method for machining a gear wheel.

BACKGROUND OF THE INVENTION

As is known, once gear wheels are cut, they undergo various thermal treatments, which alter the original geometrical and/or dimensional characteristics of the gear wheels themselves.

For this reason, following upon thermal treatment, gear wheels must necessarily again undergo machining operations of finishing using machine tools.

Finishing operations are, however, subordinate to restoring or redefinition of the axis of symmetry or of rotation of the gear wheels.

For restoring the axis of rotation it is today known to couple a first axial end portion of the gear wheel, normally the portion without internal grooves, to a rotating head with horizontal axis and to reduce manually by trial and error the eccentricity of a second, axial, end portion of the gear wheel opposite to the first end portion by progressively turning the rotating head.

Once the eccentricity has been reduced to a minimum, the first end portion is clamped on the rotating head, and a centring surface is formed on the second, axial, portion.

Once said centring surface has been obtained, the gear wheel is taken down from the rotating head, is turned upside down, the second portion is mounted on the rotating head, and the eccentricity of the first portion is reduced before the second portion is clamped on the rotating head, and a centring surface is also formed on the first portion.

At this point, the gear wheel is taken down from the rotating head and mounted between the tips of a control machine, on which, once again manually and by reference and measurement equipment, a check is made to is verify that the residual eccentricity is acceptable for the subsequent machining operations to which the gear wheel is subjected after it has been taken down from the control machine and mounted between the tips of a machine for carrying out machining.

Even though the technique of restoring the axis of symmetry described above is used universally, it requires, in the first place, the availability of qualified staff with high experience and considerable manual skills and, in any case, entails restoring times that are particularly long in so far as it is difficult to achieve manually a condition of eccentricity compatible with the subsequent machining to be carried out on the gear wheel, above all in the presence of gear wheels that present particular deformations and/or large dimensions.

In addition to this, restoring of the axis requires the use of a wide range of machines, of a plurality of measuring instruments and specific equipment, many of which must be chosen, each time, as a function of the type and characteristics of the gear wheel to be machined.

Moreover, the technique of restoring the axis does not enable increase beyond given limits of the dimensional and geometrical precision owing to the fact that, between machining of one hub and the other, the gear wheel is taken down from the rotating head, turned upside down, and again repositioned and remounted on the rotating head.

Reaching of high levels of dimensional and geometrical precision is then hindered also by the fact that the formation of the aforesaid centring surfaces is obtained with the gear wheel set in cantilever fashion and by rotating the gear wheel itself.

Machines for machining gear wheels are described, for example, in US 2007/199187 A1 and U.S. Pat. No. 5,109,634 A.

SUMMARY OF THE INVENTION

The aim of the present invention is to provide a method for machining a gear wheel that will enable a simple and inexpensive solution of the problems set forth above.

According to the present invention a method for machining a gear wheel is provided, as specified in claim 1.

The present invention moreover regards an automatic machine for machining a gear wheel.

According to the present invention an automatic machine for machining a gear wheel is provided, as specified in claim 13.

BRIEF DESCRIPTION OF THE DRAWINGS

The invention will now be described with reference to the annexed drawings, which illustrate a non-limiting example of embodiment thereof and in which.

DETAILED DESCRIPTION OF THE INVENTION

Figure 1:
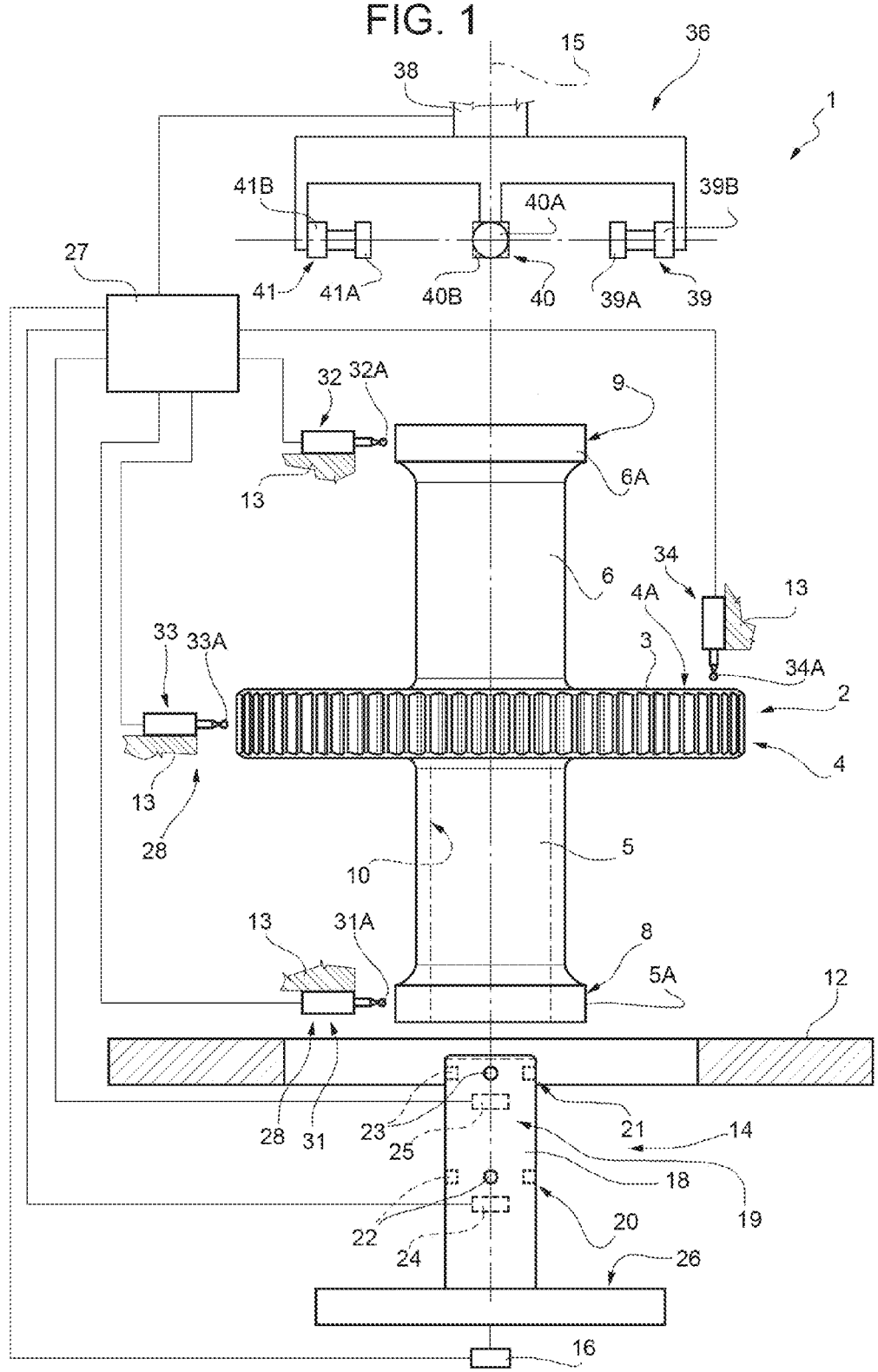
FIG. 1 illustrates, in side view and substantially in the form of blocks, an automatic machine for machining a gear wheel set in a condition where it may receive the gear wheel to be machined.

In FIG. 1, designated as a whole by 1 is an automatic machine for positioning and machining a gear wheel 2 coming from a thermal-treatment station, not visible in the attached figures and, specifically, for restoring or redefining an axis of symmetry or rotation of the gear wheel 2 itself.

According to what is illustrated in the attached figures, the gear wheel 2 comprises an intermediate crown wheel 3 having an external toothing 4, specifically with straight teeth, and two lateral hubs 5 and 6 that extend in cantilever fashion in opposed directions from opposite axial sides of the crown wheel 3.

The hubs 5 and 6 terminate with respective external tubular portions 5A and 6A delimited externally by respective surfaces 8 and 9, and the hub 5 has an internal groove 10.

Once again with reference to FIG. 1, the machine 1 comprises a machine bed 12, a frame 13 projecting upwards from the machine bed 12, and a bottom rotating head 14, which is rotatably coupled to the machine bed 12 about a fixed vertical axis 15 and in an axially fixed position and is driven by a corresponding motor 16. The head 14 comprises a top terminal portion 18, which is designed to engage the hub 5 slidably and with radial play and in turn comprises a configurable motor-driven device 19 for positioning and retention of the gear wheel 2.

Figure 2:
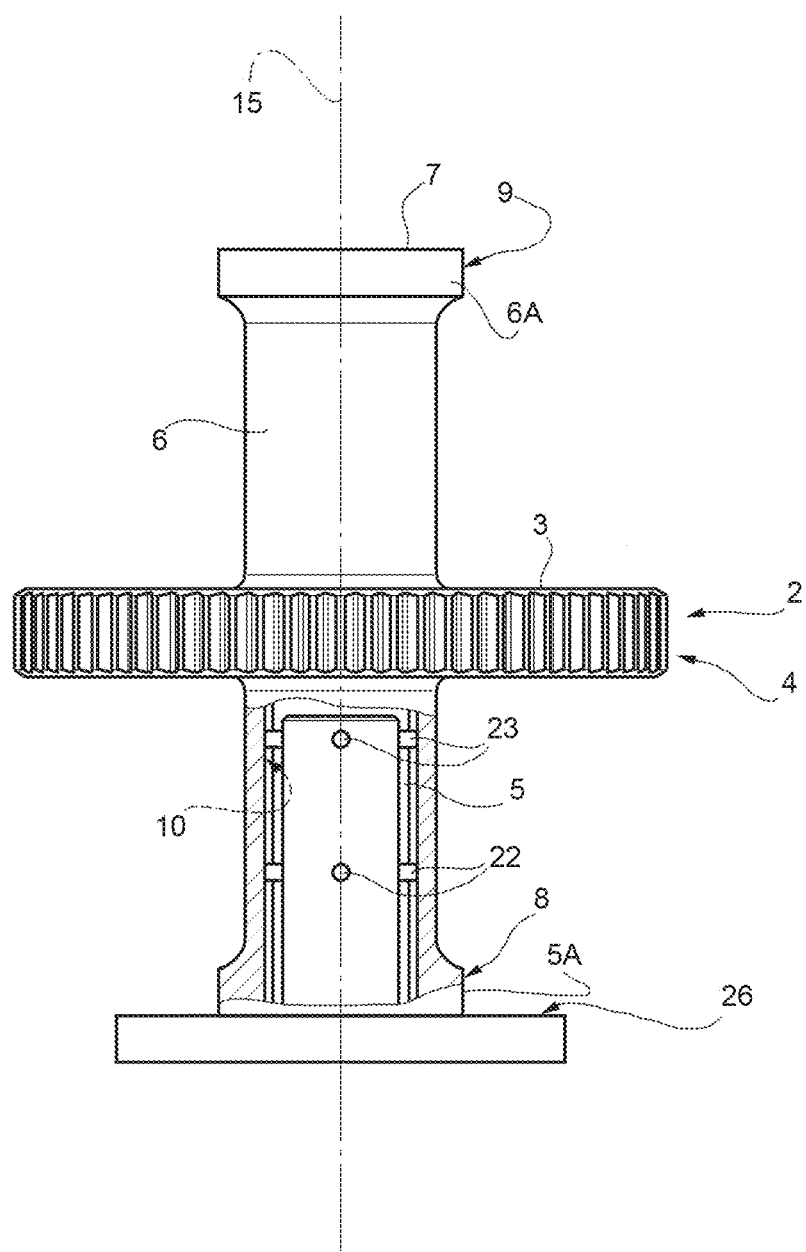
FIGS. 2 to 8 are figures similar to FIG. 1 and illustrate the machine of FIG. 1 with parts removed for reasons of clarity in seven different operating conditions.

In the particular example described, the device 19 is of the controllable-retention type and comprises two rings of spherical heads, set at an axial distance apart and designated by 20 and 21. Each ring 20, 21 comprises a corresponding plurality of mobile centring pins 22, 23 with spherical head set at an angular distance from one another about the axis 15 by an angle equal to that of the compartments of the grooved stretch 10. For each of the rings 20, 21, the device 19 further comprises a respective motor-driven actuation assembly 24 and 25, in a per se known manner and not described in detail. The assemblies 24 and 25 are distinct and independent of one another and are designed to displace radially the respective centring pins 22, 23 between a retracted resting position (FIG. 1), in which the centring pins 22, 23 extend within the portion 18 to enable a free displacement of the portion 18 itself within the grooved stretch 10 of the hub 5, and an operative extracted position (FIG. 2), in which the centring pins 22, 23 are inserted in the compartments of the grooved stretch 10 and angularly clamp the hub 5 to the head 14.

The device 19 then comprises an axial shoulder 26 for resting and axial positioning of the gear wheel 2, which is mobile together with the head 14.

Once again with reference to FIG. 1, the machine 1 further comprises a command and control unit 27, electrically connected to which are the motor 16 and the actuation assemblies 24 and 25, and an automatic assembly 28 for detection of the position of the gear wheel 2, which is also electrically connected to the unit 27.

The detection assembly 28 in turn comprises four electrical position sensors, designated by 31, 32, 33, and 34 coupled to the frame 13 and all electrically connected to the unit 27 in order to send respective electrical position signals to the unit 27 itself.

Figure 3:
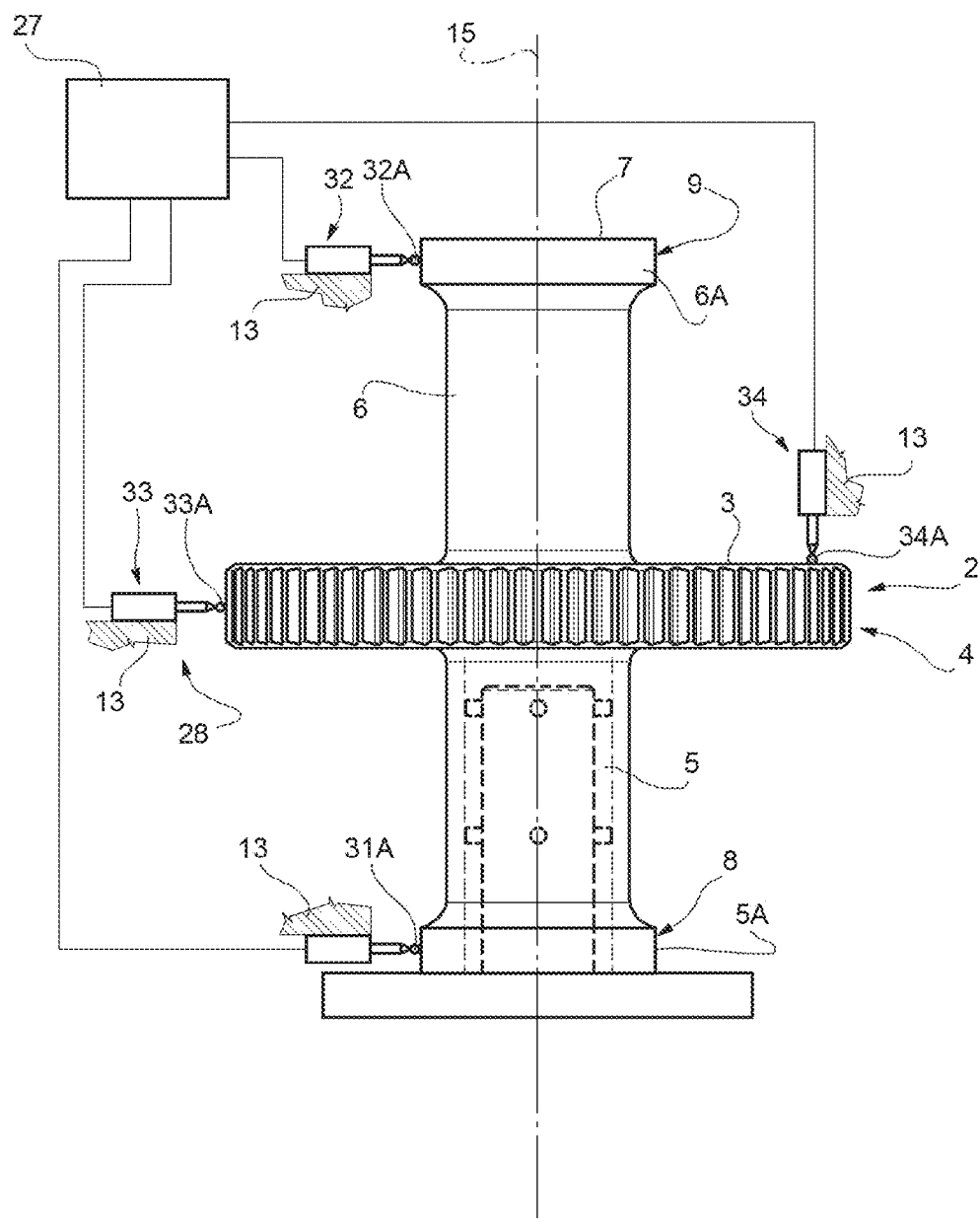

With reference to FIG. 3, the sensors 31, 32, and 33 are radial sensors and comprise respective feelers 31A, 32A, 33A, which are mobile away from and towards the axis 15 in respective radial directions orthogonal to the axis 15 and, in use, respectively, towards the outer circumferential surfaces 8 and 9 and towards the toothing 4 of the gear wheel 2.

The sensor 34 is, instead, an axial sensor and comprises a feeler 34A mobile in a direction parallel to the axis 15 and, in use, towards an axial surface 4A of the crown wheel 3.

Figure 4:
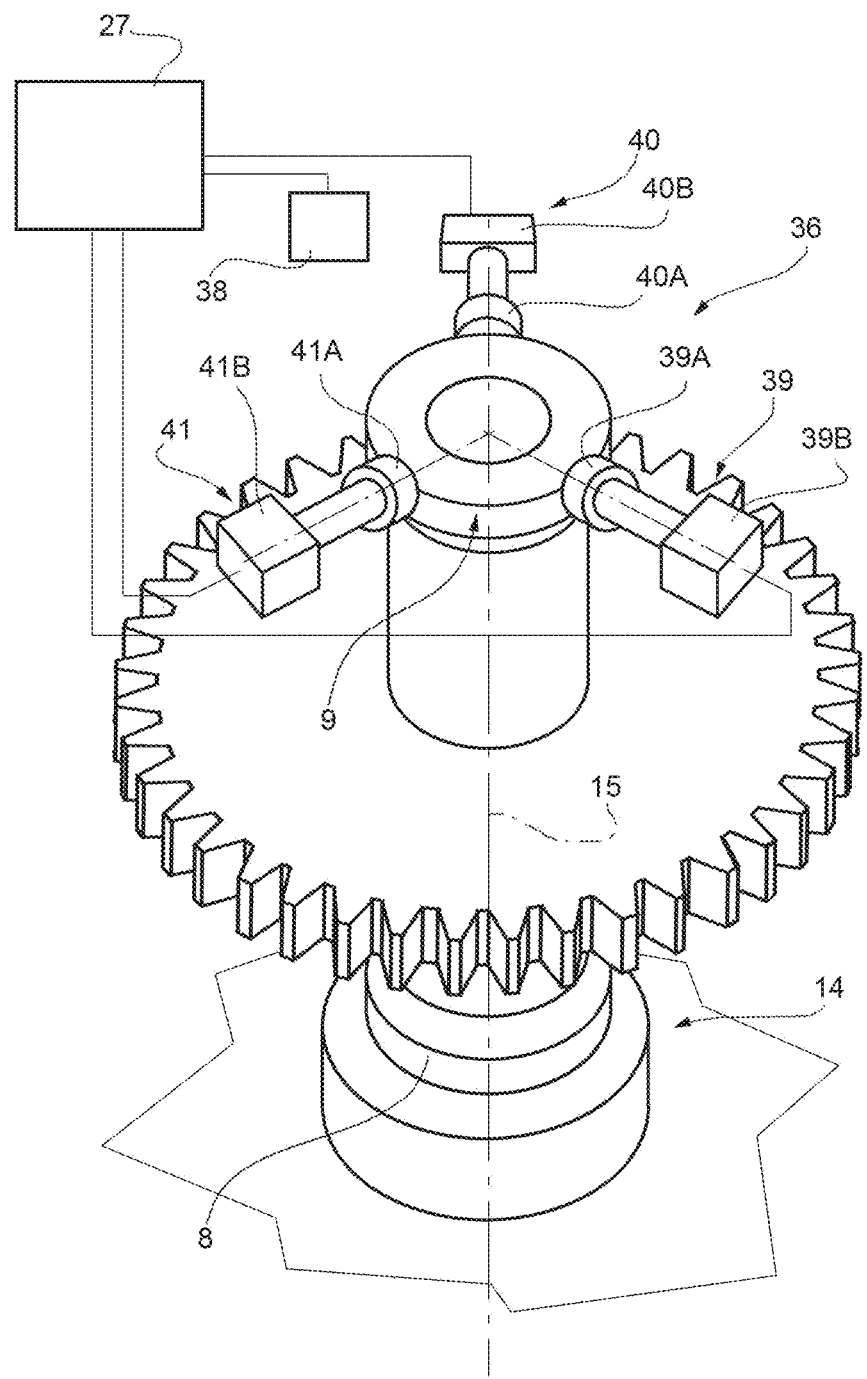
Figure 5:
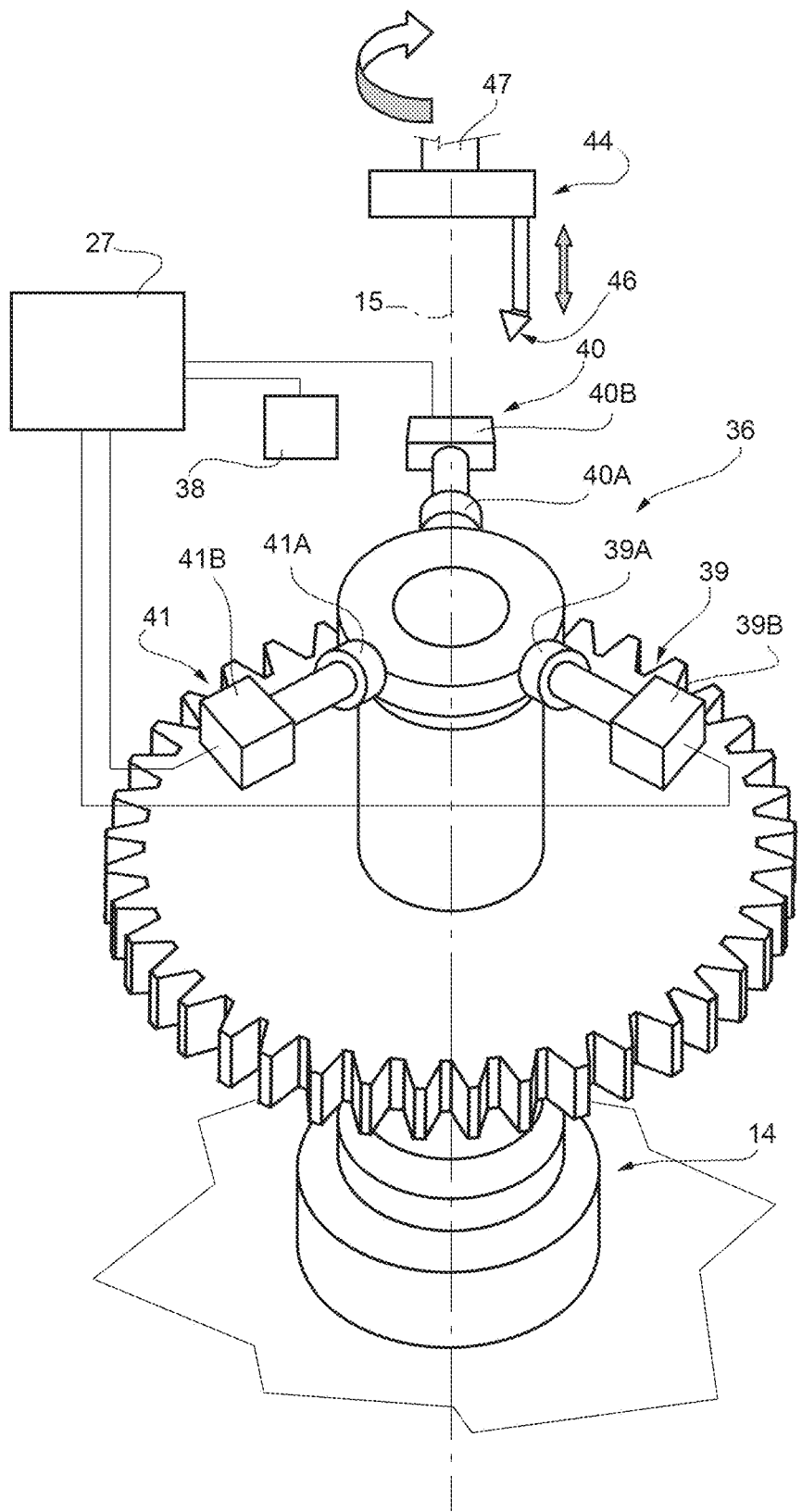

Once again with reference to FIG. 1 and, in particular, to FIG. 4, the machine 1 also comprises a motor-driven positioning and retention top head 36, which is set along the axis 15 and is also mobile along the axis 15 away from and towards the bottom head 14 under the thrust of an own actuator (represented schematically) connected to the unit 27.

The top head 36 conveniently comprises three contrast elements, designated by 39, 40, and 41, which are arranged about the axis 15 in angular positions set at equal distances apart. Each contrast element 39, 40, and 41 carries a respective resting member 39A, 40A, 41A, which is mobile away from and towards the axis 15 in a corresponding direction orthogonal to the axis 15 itself under the thrust of an own motor-driven linear actuator 39B, 40B, 41B that is independent of the linear actuators of the other members and is electrically connected to the unit 27, as illustrated in FIGS. 1 and 4.

Figure 6:
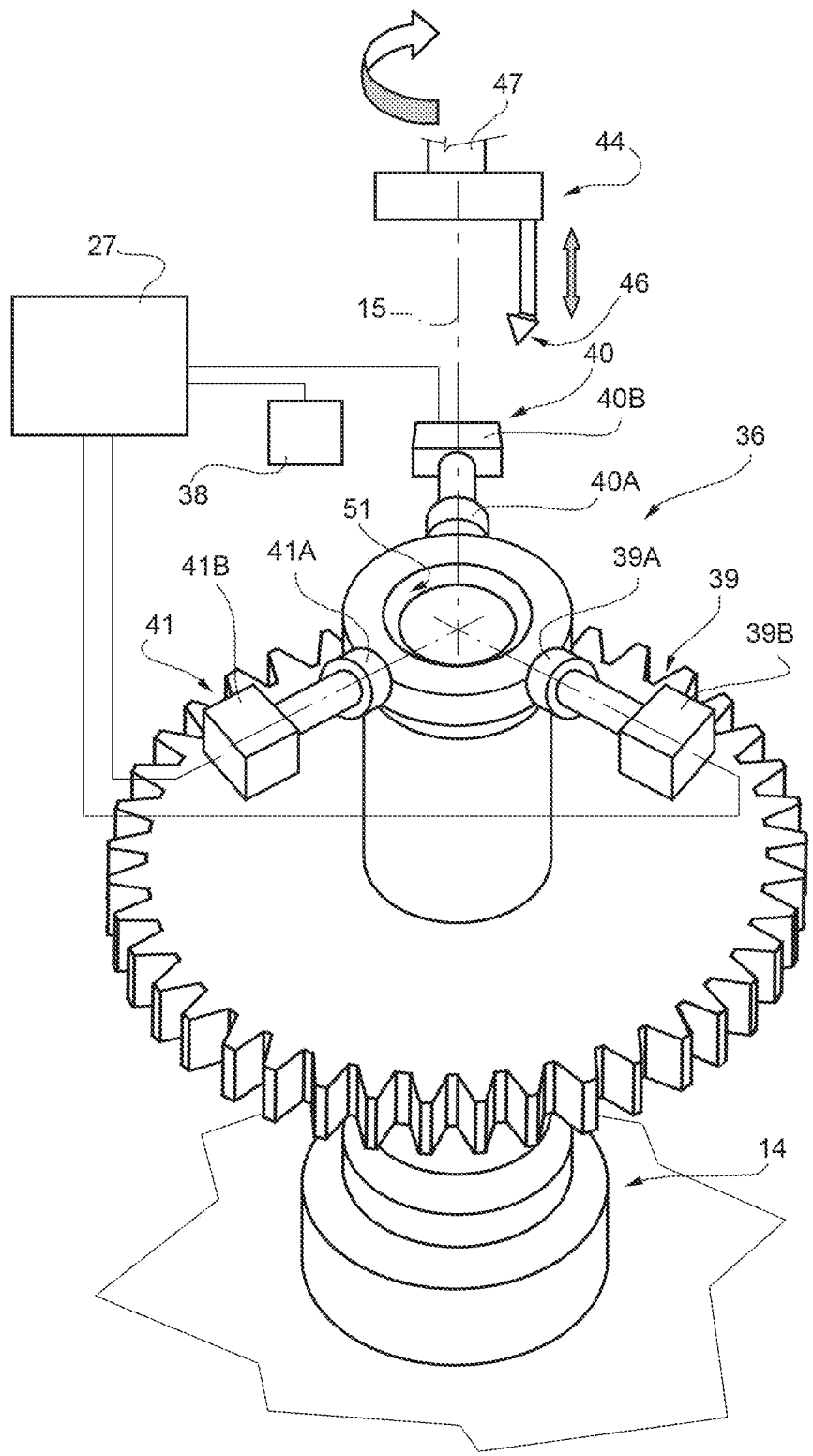
Figure 7:
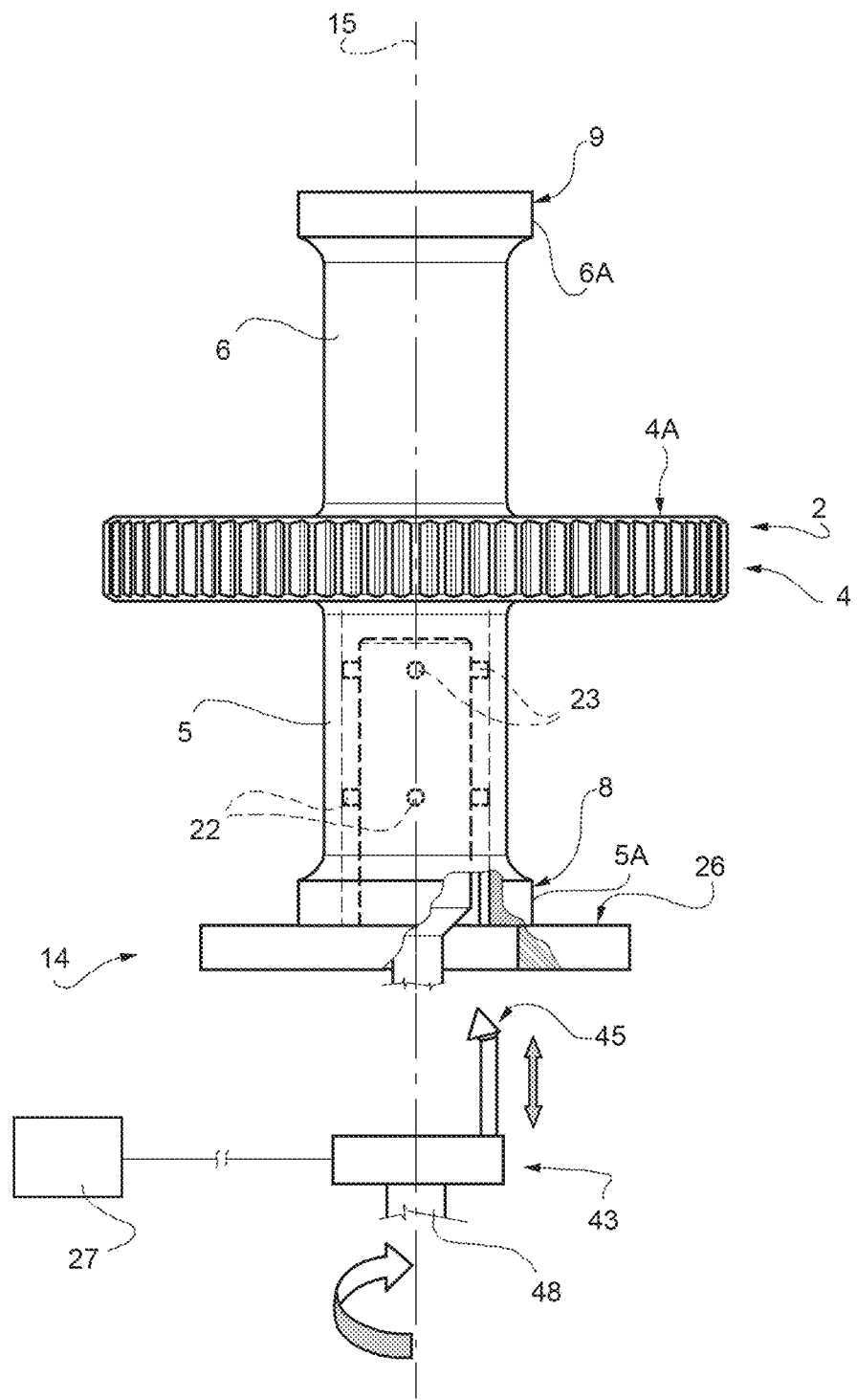

With reference to FIGS. 6 and 7, finally, the machine 1 comprises two rotating machining heads, designated by 43 and 44, each of which supports a respective reaming tool 45, 46. As illustrated in FIG. 6, the head 44 is set above the positioning head 36 and is coupled to an own actuation assembly 47, in a per se known manner and not described in detail, which is controlled by the unit 27 for translating in a direction parallel to the axis 15 and rotating about the axis 15 itself.

With reference to FIG. 7, the head 43 is, instead, set underneath the rotating head 14 and is driven by an own actuation assembly 48, in a per se known manner and not described in detail, which is distinct and independent of the device 47 and is also controlled by the unit 27 for translating in a direction parallel to the axis 15 and rotating about the axis 15 itself.

Operation of the machine 1 will now be described starting from a resting condition, illustrated in FIG. 1, in which the unit 27 keeps the rotating head 14 in an angularly fixed position with the respective centring pins 22 and 23 in their retracted resting position, the feelers 31A, 32A, 33A and 34A of the sensors 31-34 in positions set apart from the respective surfaces, and the positioning head 36 and machining heads 43 and 44 in positions set apart from the top head 36 itself and from the bottom rotating head 14, as may be seen in FIGS. 1, 7 and 8.

Starting from the above condition, the gear wheel 2 at output from the thermal-treatment station is coupled to the rotating head 14 by inserting axially the portion 18 inside the grooved stretch 10 until the portion 5A is brought to bear upon the shoulder 26 and by rotating the gear wheel 2 itself until the compartments of the grooved stretch 10 are brought up to the centring pins 22 and 23, after which the unit 27 activates both of the devices 24 and 25, causing the centring pins 22, to engage the compartments of the grooved stretch, thus clamping the hub 5 on the rotating head 14.

At this point, the machine 1 follows a completely automatic cycle, i.e., without requiring intervention on the part of an operator, under the control of the unit 27 alone, which in a completely autonomous way displaces the feelers 31, 32 and 34 into a position where each of them faces the respective surface, and the feeler 33 into a position where it faces the toothing 4.

After this, the unit 27 causes the feelers 31A-34A to advance until they come into contact with the respective surfaces and, when they reach them, acquires the respective zero or reference positions. Then the unit 27 rotates the head 14, and thus the gear wheel 2, conveniently in a stepper way, about the axis 15. During rotation, for each angular position of the gear wheel 2, each of the sensors 31-34 sends to the unit 27 an own electrical signal that practically corresponds to an instantaneous eccentricity of own surface with respect to the fixed axis 15.

At the end of the first revolution of the gear wheel 2, the unit 27 lowers the top head 36 until the contrast elements 39A-41A are brought into a position where they face the surface 9 of the hub 6, as illustrated in FIG. 4, after which the unit 27 itself processes, according to a program for minimization of eccentricity, i.e., such as to bring the gear wheel 2 into a position substantially aligned with the axis 15, the signals received, thus determining an angular position of thrust and axial displacement of the resting members 39A-41A away from and towards the axis 15 in the respective directions for eliminating or rendering minimum the eccentricity of the gear wheel 2 with respect to the fixed axis 15 itself. At this point, the centring pins 23 of the ring 21 are brought back into their resting position, in effect enabling the hub 5 to oscillate with respect to the bottom rotating head 14, and one or more resting members 39A-41A, and consequently the hub 6, are displaced in a direction orthogonal to the axis 15 until an optimal axis of symmetry of the gear wheel 2, at this point coinciding with the fixed axis 15, is restored or redefined. Once correction of the eccentricity is through, the contrast members 39A-41A are clamped in their axial positions. In this condition, the sensors 31-34 send to the unit 27 further electrical signals of fine repositioning that the unit 27 reprocesses before sending a signal for enabling machining of the gear wheel 2.

Figure 8:
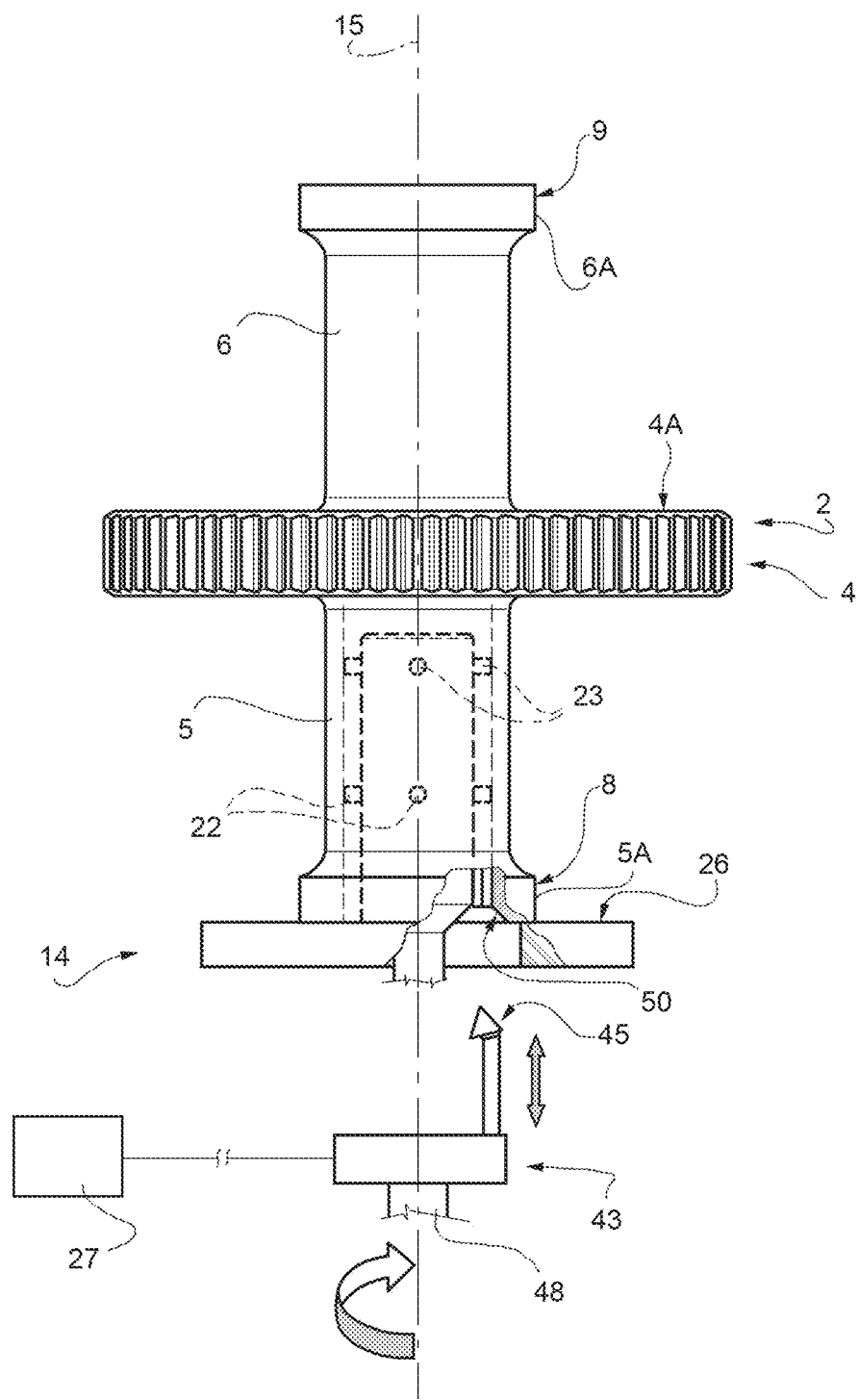

In the presence of said enabling signal, the unit 27 brings the spherical-head centring elements 23 back into their advanced position (FIG. 2), clamps the bottom rotating head 14, keeping the gear wheel 2 in an angularly and axially fixed position, causes the tools 45 and 46 to advance towards the corresponding portions 5A, 6A of the respective hubs 5, 6, and guides them for carrying out on each of the portions 5A, 6A themselves respective internal centring reamings 50 and 51 sharing the fixed axis, as illustrated in FIGS. 6 and 8. Conveniently, the reamings 50 and 51 are obtained simultaneously.

Once the reamings 50 and 51 have been completed, the resting members 39A-41A are moved away, the top head 36 is set at a distance from the portion 6A, the centring pins 22 and 23 are brought into their resting positions, and the gear wheel 2 is uncoupled from the bottom rotating head 14 and moved into a grinding station, in which a pair of centring tips are inserted in the reamings 50 and 51, thus centring the gear wheel 2 and setting it in a grinding position.

From the foregoing description, it is evident that the technique of restoring the axis of symmetry of the gear wheel 2, owing to the fact that it is performed in a completely automatic way once the gear wheel 2 has been mounted on the rotating head 14, does not require the presence of qualified staff with specific experience. In fact, the unit 27 autonomously determines the eccentricity of the gear wheel 2 and repositions it along a fixed reference axis 15 for evening out always in the same way the eccentricities of different portions of the gear wheel 2 irrespective of the deformations and/or of the geometrical or dimensional characteristics of the gear wheels.

The use of position sensors and displacement actuators mounted on the same frame of the machine 1, and thus on board the machine, and of actuators acting in response to the signals received from the sensors themselves and processed by the unit 27 enables drastic reduction in the times for redefinition of the axis, which in the majority of cases is obtained following upon just a single complete revolution of the gear wheel 2.

In addition to this, it is again the unit 27 that clamps the gear wheel 2 in an optimal reference position and always carries out in an autonomous way the centring reamings 50 and 51.

In this regard, it is to be noted how both of the reamings 50 and 51 are obtained keeping just one of the hubs coupled to the rotating head 14, i.e., without taking the gear wheel 2 down from the rotating head 14 itself. This, as compared to the known technique, enables drastic reduction in times and, in any case, considerable improvement of the quality thereof, as well as enabling removal of minimal amounts of material in the subsequent grinding operation.

The times are then further reduced in the case where the two reamings 50 and 51 are made simultaneously. The times are, in any case, reduced as compared to the known technique also in the case where the reamings 50 and 51 are obtained by rotating the gear wheel 2 about the axis 15 and keeping the reaming tools 45 and 46 in fixed positions and/or by setting the gear wheel 2 in a horizontal position instead of a vertical position as described. It is, however, evident that restoring of the axis is easier when performed with the gear wheel in a vertical position in so far as, in this position, the weights and dimensions of the gear wheels have absolutely no effect.

As regards specifically the machine 1, this is relatively simple from a constructional standpoint, bearing in mind that according to the known technique the redefinition of the axis requires the availability of two or more distinct machines for carrying out machining and at least one control machine provided with respective dedicated accessories/tooling.

From the foregoing description, it is evident that modifications and variations may be made to the method and the machine 1 described, without thereby departing from the scope defined by the independent claims. In particular, the electrical sensors 31-34 and the contrast elements 39-41 could differ, from a constructional standpoint, from the ones described and be set in positions different from the ones indicated. Then the heads 14 and 36 could differ from the ones described, for example for meeting specific geometrical or dimensional characteristics of the gear wheels to be detected and machined. Specifically, the head could receive the hub 5 partially and not be inserted therein.

Finally, the rotating machining heads 43 and 44 could be fixed heads, and the reamings 50 and 51 could be obtained by rotating the gear wheel 2 about the fixed vertical axis 15.

The invention claimed is:

1. A method for machining a gear wheel comprising at least one outer crown wheel, a first hub and a second hub opposed to each other and projecting in cantilever fashion from opposite axial sides of said crown wheel, the method comprising the steps of: coupling said first hub to a motor-driven rotating head having an own fixed vertical axis of rotation; displacing said second hub in a direction transverse to said fixed axis; bringing said hubs into a position substantially sharing said fixed axis; and machining the hubs, providing on each of said hubs a respective inner centring surface sharing said fixed axis; the steps of bringing said hubs into a position substantially sharing said fixed axis and of machining the hubs themselves to obtain said inner centring surfaces are obtained without uncoupling said first hub from said motor-driven rotating head.

2. A method according to claim 1, characterized in that the steps of bringing said hubs into a position substantially sharing said fixed axis and of machining the hubs themselves to obtain said centring surface are performed, keeping said axis in a vertical position.

3. A method according to claim 1, characterized in that said centring surfaces are provided, keeping said gear wheel in an angularly fixed position about said fixed axis.

4. A method according to claim 1, characterized in that formation of said centring surfaces is obtained, constraining said first hub on said rotating head and the second hub on a further retention head distinct from said rotating head.

5. A method according to claim 1, characterized in that said centring surfaces are obtained simultaneously.

6. A method according to claim 1, characterized in that said first hub is coupled to said rotating head by inserting a configurable retention member within a grooved stretch of said first hub and modifying the constraint with said retention member by varying the configuration of said retention member during execution of said steps.

7. A method according to the claim 6, characterized in that the constraint between said retention member and said first hub is modified by activating one or more retention devices co-operating with an internal groove of said first hub.

8. A method according to claim 1, characterized in that the step of bringing said hubs into a position substantially sharing said fixed axis comprises the operations of: displacing at least one electrical sensor towards said gear wheel in a direction transverse to said fixed axis; bringing at least one feeler of said electrical sensor into contact with a lateral surface of said gear wheel; rotating the gear wheel about said fixed axis; detecting a plurality of electrical signals, which correspond to an instantaneous eccentricity of said surface with respect to the fixed axis and are proportional to the instantaneous displacement of said feeler in said direction; processing said signals via an electronic processing and control unit; and governing, via said electronic processing and control unit, at least one motor-driven actuator that acts on said gear wheel to vary the eccentricity of said second hub with respect to said fixed axis as a function of said processing of the electrical signals.

9. A method according to claim 8, characterized in that the step of bringing said hubs into a position substantially sharing said fixed axis comprises the operations of: identifying a plurality of outer lateral surfaces of said gear wheel distributed along said fixed axis; using one said electrical sensor for each said lateral surface; processing, via said control unit, the electrical signals sent by said electrical sensors; and issuing a single control signal to said motor-driven actuator.

10. A method according to claim 9, characterized in that said lateral surfaces are circumferential surfaces that delimit externally one said first hub, one said second hub, and said crown wheel.

11. A method according to claim 9, characterized in that at least one of said lateral surfaces is an axial surface orthogonal to said fixed axis.

12. A method according to claim 1, characterized in that said centring surfaces are obtained by rotating said gear wheel about said fixed axis.

13. An automatic machine for machining a gear wheel, comprising at least one outer crown wheel, a first hub, and a second hub opposed to each other and projecting in cantilever fashion from opposite axial sides of said crown wheel, the machine comprising a motor-driven rotating head having an own fixed vertical axis of rotation and comprising motor-driven retention means and controllable-retention means, the machine further comprising motor-driven movement means for displacing said second hub in a direction transverse to said fixed vertical axis to bring it into a position substantially sharing said fixed vertical axis, a first motor-driven tool head and a second motor-driven tool head that are mutually independent for obtaining on the first and on second hubs, respectively, a respective inner centring surface sharing said fixed vertical axis, a plurality of position sensors, which co-operate with respective surfaces of the gear wheel for detecting the deviation of the surfaces themselves from said fixed vertical axis and are designed to issue respective electrical position signals, and a control unit for processing the electrical signals issued by said position sensors and issuing signals for controlling said motor-driven heads, said sensors, and said motor-driven retention and movement means, as a function of the signals issued by said position sensors.

14. A machine according to claim 13, characterized in that both of said tool heads extend coaxially with respect to said fixed vertical axis in positions set at axial distances apart.

15. A machine according to claim 13, characterized in that said motor-driven retention means and controllable-retention means comprise an elongated retention member sharing said fixed axis and designed to be inserted within a grooved stretch of said first hub, a plurality of radial retention pins carried by said retention member, and further motor-driven actuation means for actuation of said pins, said means being controlled by said unit for displacing the pins radially between a retracted resting position and an extracted retention position in which the pins are forced within respective compartments of said grooved stretch.

16. A machine according to claim 15, characterized in that said rotating head comprises two rings of said pins that may be actuated independently of one another.

* * * * *